United States Patent
Rauch

(10) Patent No.: US 7,043,889 B2
(45) Date of Patent: May 16, 2006

(54) MACHINE FOR HARVESTING STALK CROPS

(75) Inventor: Hans Rauch, Bad Saulgau (DE)

(73) Assignee: CLAAS Saulgau GmbH, (DE)

( * ) Notice: Subject to any disclaimer, the term of this patent is extended or adjusted under 35 U.S.C. 154(b) by 0 days.

(21) Appl. No.: 10/767,817

(22) Filed: Jan. 29, 2004

(65) Prior Publication Data
US 2004/0182060 A1   Sep. 23, 2004

(30) Foreign Application Priority Data
Jan. 29, 2003   (DE) ................................ 103 03 380

(51) Int. Cl.
  *A01D 34/03*   (2006.01)
  *A01D 34/43*   (2006.01)
  *A01D 34/64*   (2006.01)
(52) U.S. Cl. ........................................................ 56/15.9
(58) Field of Classification Search .................. 56/208, 56/51, 219, 210, 221, 228, 15.9
See application file for complete search history.

(56) References Cited

U.S. PATENT DOCUMENTS

| | | | | |
|---|---|---|---|---|
| 4,126,189 A | * | 11/1978 | Channel | 172/456 |
| 4,355,690 A | * | 10/1982 | Jensen et al. | 172/311 |
| 4,409,780 A | * | 10/1983 | Beougher et al. | 56/228 |
| 4,449,590 A | * | 5/1984 | Williamson | 172/126 |
| 4,903,470 A | * | 2/1990 | Hemker et al. | 56/228 |
| 5,178,328 A | * | 1/1993 | Broyhill | 239/168 |
| 5,577,563 A | * | 11/1996 | Holen | 172/456 |
| 5,673,543 A | * | 10/1997 | Richardson et al. | 56/85 |
| 5,724,798 A | * | 3/1998 | Stefl et al. | 56/119 |
| 5,845,472 A | * | 12/1998 | Arnold | 56/94 |
| 5,911,625 A | * | 6/1999 | von Allworden | 460/119 |
| 6,092,609 A | * | 7/2000 | Jeffery et al. | 172/311 |
| 6,109,012 A | * | 8/2000 | Staal et al. | 56/367 |
| 6,220,366 B1 | * | 4/2001 | Noonan et al. | 172/311 |
| 6,367,562 B1 | * | 4/2002 | Mosdal | 172/311 |
| 6,684,962 B1 | * | 2/2004 | Lewallen | 172/311 |

FOREIGN PATENT DOCUMENTS

| | | |
|---|---|---|
| DE | 7302542 | 4/1973 |
| DE | 3512992 | 10/1986 |
| DE | 4138213 | 5/1993 |
| EP | 0992187 | 4/2000 |

* cited by examiner

*Primary Examiner*—Árpád Fábián Kovács
(74) *Attorney, Agent, or Firm*—Husch & Eppenberger, LLC

(57) ABSTRACT

A harvesting machine for harvesting stalk crops, such as maize or the like, has at least two cutting and intake units which have a series of drum-like cutting and intake elements which can be rotated about essentially vertical axes and are fastened to supporting elements. It is arranged for at least one cutting and intake unit to be pivoted about a pivot axis which is positioned in the direction of travel. When the cutting and intake units are in a transporting position, the view in the direction of travel is significantly improved. This is achieved by at least two intake and cutting units being arranged so they can be pivoted in opposed directions so that one overlies the other in the transporting position and so that those on one side of the machine are spaced from those on the other side of the machine at that position.

5 Claims, 5 Drawing Sheets

MACHINE FOR HARVESTING STALK CROPS

CROSS REFERENCE TO RELATED APPLICATIONS

This application claims priority of German application, DE 103 03 380.7, filed Jan. 29, 2003.

STATEMENT REGARDING FEDERALLY SPONSORED RESEARCH OF DEVELOPMENT

Not Applicable.

APPENDIX

Not Applicable.

BACKGROUND OF THE INVENTION

1. Field of the Invention

The invention relates generally to a harvesting machine or attachment for harvesting stalk crops, such as maize or the like, and more particularly to such a machine having cutting and intake portions which are moveable between a working position and a transporting position.

2. Related Art

A harvesting machine of this type has been disclosed, for example, by the publication EP 0 992 187 A1. This publication describes a self-propelled machine with a harvesting attachment which has rotating intake and cutting drums arranged next to one another. These intake and cutting drums are fitted to pivotable frame elements. In this case, four intake and cutting drums are fitted to a base frame arranged in front of the machine in the direction of travel while, to the side thereof, two intake and cutting drums are arranged in each case on pivotable frame parts and one intake and cutting drum is arranged in each case on a further, likewise pivotable outer frame. In a transporting position, the lateral frame parts and the outer frame parts are pivoted upward and inward, which accordingly results in the transporting width which is significantly reduced in comparison with the working position.

The machine of the described type has the disadvantage that the inwardly pivoted cutting and intake units are arranged in front of the driver's cab in the direction of travel and therefore may, under some circumstances, depending on the structural shape, impair the view of the roadway in the direction of travel.

SUMMARY OF THE INVENTION

It is therefore the object of the invention to propose a corresponding machine with an improved view in the direction of travel.

Accordingly, a harvesting machine according to the invention is distinguished in that at least two cutting and intake units having cutting and intake elements are aligned in a manner such that they can pivot in an opposed direction of rotation. This results in structural possibilities of arranging the arrangement of the cutting and intake units in the transporting position in such a manner that, in the straight ahead direction, a largely free view of the carriageway is possible.

In one preferred embodiment, a base unit which is fitted essentially centrally in the machine is provided. An arrangement of this type provides various advantages.

Firstly, a substantial part of the working width can be covered with a single-piece frame construction. Moreover, the coupling of the drive of the machine into the corresponding attachment implement with a base unit of this type can be brought about more easily. Moreover, the height adjustment of the attachment implement on a base unit configured in such a way can be designed in a conventional manner. In addition, the entire suspension of the attachment implement on the machine can be all the more stable and secure against tilting, the further the fastening to the machine extends over the width of the machine. The base unit is therefore advantageously not only arranged centrally in front of the machine; rather, it is moreover designed in such a manner that it extends essentially over the entire width of the machine. This width corresponds essentially also to the overall width of the machine in the transporting position of the attachment implement.

The full utilization of the width of the machine for of the base unit has the further advantage that the pivotable units of the attachment implement which are situated outside the width of the machine in the working position can be designed to be correspondingly shorter while operating in the same way. In one development of the invention, at least one cutting and intake unit designed as an intermediate wing and at least one cutting and intake unit designed as an outer wing are attached on the outside of the base unit, it being possible for the outer wing and the intermediate wing to be pivoted in an opposed direction of rotation. This enables the outer wing to be folded together with the intermediate wing in the edge region of the base unit, so that it is possible, apart from the construction of the necessary intake and cutting elements on the base unit, to keep the central region free of further structural elements projecting vertically. This arrangement is one example of the manner in which the view of the carriageway in the direction of travel is not disturbed.

In one development of the invention, the intermediate wing is designed in a manner such that it can be pivoted inward beyond the vertical position in the transporting position.

This enables the pivot axis to be shifted outward as far as possible to pivot in the intermediate wing into the transporting position without the outer wing protruding over the transporting width of the machine in the transporting position.

For this purpose, the outer wing is designed in a manner such that it can be pivoted outward through essentially 180° with respect to the intermediate wing. In this embodiment, the outer wing is pivoted to a maximum extent with respect to the intermediate wing, so that it may, if appropriate, also rest on the intermediate wing or on the machine components fitted to it. This enables a stable position of the outer wing with the associated machine parts to be produced on the intermediate wing. Furthermore, with the outer wing pivoted to this maximum extent, the angle of inclination of the intermediate wing inward is minimal, i.e. exactly large enough to achieve the desired transporting width without the intermediate wings moving into the central region and therefore into the field of view of the driver in the straight ahead direction.

Particularly in the above-described refinement with a comparatively wide base unit which extends, if appropriate, over the entire width of the machine, and intermediate wings and outer wings adjoining it on the outside, the number of cutting and intake elements which are provided is reduced starting from the base unit toward the outer wing. The outer wings, which are situated furthest to the outside in the working position, are therefore shorter and lighter in relation to the intermediate wing, which, in turn, can be designed to be shorter and lighter in relation to the base unit or the construction thereof. The loading of the pivoting mechanisms is therefore reduced, the further outward the latter are situated.

Mechanical loadings of the pivoting mechanisms can be brought about by various causes. They have to be carried along, for example, in the forward movement of the machine. This results in a counterforce to the rear either due to contact with the ground or else due to the counter pressure of the plants to be harvested. The shorter the corresponding wings are designed to be, the weaker is the corresponding torque which acts on the pivoting mechanisms. In addition, shorter and lighter pivoting wings can be raised more easily, i.e. the corresponding driving elements can be of smaller dimensions. Furthermore, shorter and lighter side wings Also result in a lower loading of the pivoting mechanisms in the transporting position, for example due to bumps which are caused by unevenness in the carriageway, braking and steering processes or the like.

In order to bring about an unimpaired field of view in the direction of travel, the transporting position is advantageously designed in such a manner that the intermediate wings on both sides and the outer wings fastened thereto are spaced apart from one another in such a manner that the central region remains free.

The pivot axis between the intermediate wing and the outer wing is preferably arranged in the region close to the ground, with reference to the working position. This enables the outer wing to be pivoted through 180° in relation to the intermediate wing with the aid of a simple realization of the axis and without major structural measures.

Furthermore, if required, a rear wall can be provided on the rear side of the intermediate wing and of the outer wing, along which the plant stalks which have been cut off and drawn in can be guided inward. In the embodiment described, in which the outer wing is pivoted downward and outward with respect to the intermediate wing, it is possible to design the respective rear walls of the outer wing and of the intermediate wing in such a manner that they can be joined to each other essentially over the entire height of the rear wall in the working position. In this connection, an arrangement is possible in which the rear walls are positioned in one direction. This is not possible during a pivoting movement inward. In this case, either, as described in the abovementioned prior art, an elastic intermediate region has to be provided or else an overlap of two wall regions arranged offset with respect to the direction of travel has to be provided.

The pivot axis between the base unit and the intermediate wing is preferably arranged in the upper half of the construction, which comprises the cutting and intake elements and the rear wall. This permits the pivoting movement of the intermediate wings inward with the aid of a simple pivot axis without individual components striking against one another. If the pivot axis is arranged in this case at a somewhat lower point than the upper edge of the rear wall, then it is recommended to bevel said rear wall toward the pivot axis in order thus to produce a free angular region for the pivoting movement.

If the pivot axis is positioned sufficiently far upward for it to be situated level with the upper edge of the rear wall, then a joining in one direction can also be realized at this connecting point.

The harvesting machine according to the invention can be designed as a mounted implement for an agricultural machine or else as part of a self-propelled harvesting machine.

One exemplary embodiment of the invention is illustrated in the drawing and will be explained in greater detail below with reference to the figures.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE EMBODIMENTS

Figure 1:
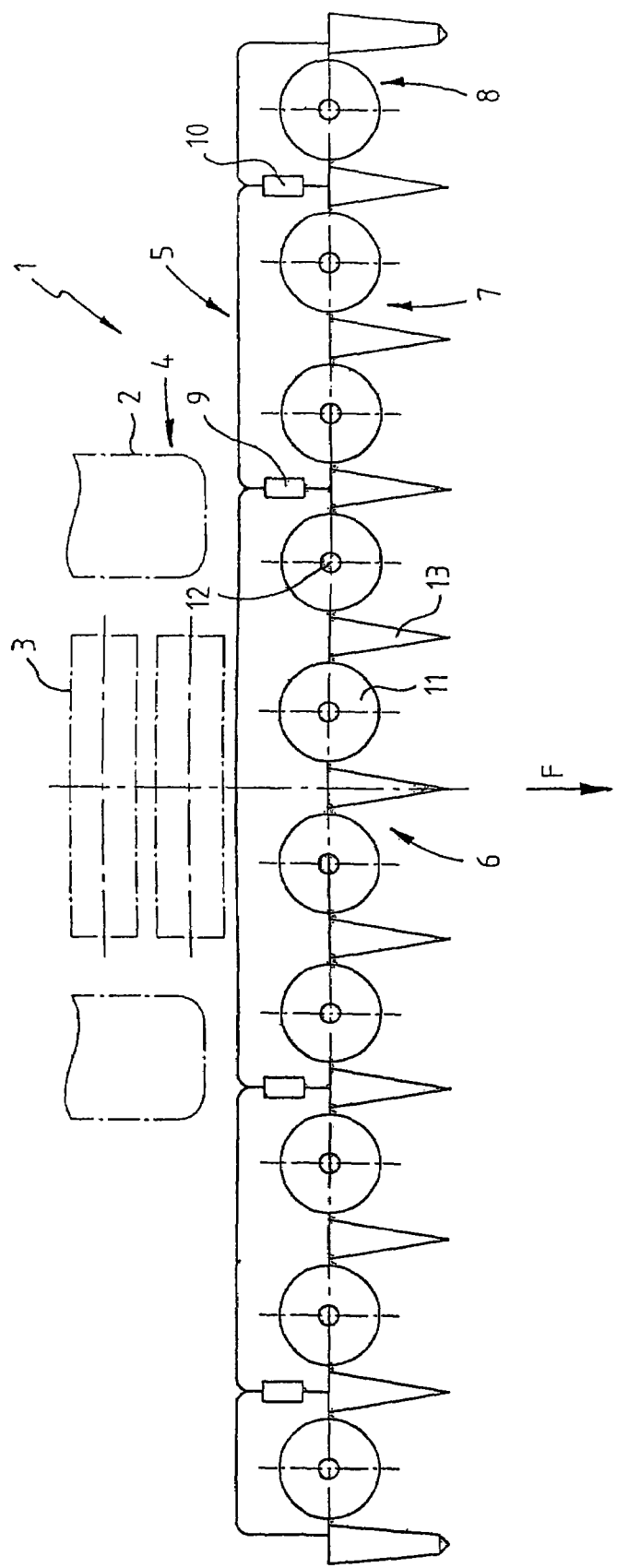
FIG. 1 is a plan view of a harvesting machine or attachment embodying to the invention.

A harvester 1 includes a machine 4 which is illustrated schematically with reference to front wheels 2 and intake rollers 3 for the harvested crop. A harvesting attachment 5 is fitted (in a manner not illustrated specifically) to the machine 4 and can be driven via the machine 4 in a conventional manner.

The harvesting attachment 5 comprises a base unit 6, which is arranged centrally and on the front side in front of the machine 4 and on which one cutting and intake unit designed as an intermediate wing 7 and one cutting and intake unit designed as an outer wing 8 are articulated in a pivotable manner on both sides in each case.

Pivot axes 9, 10 are situated here in the direction of travel F. In other words, the pivot axes 9, 10 extend longitudinally and generally parallel to a longitudinal axis of the machine 4. Cutting and intake elements 11 are arranged on the base unit 6 and on the intermediate wings 7 and outer wings 8 and, in a working position shown in FIG. 1, can be rotated about an essentially vertical axis of rotation 12. The individual cutting and intake elements 11 are separated by divider fingers 13 which direct the crop to be harvested (not illustrated), to the particular cutting and intake element 11. This occurs as the crop strikes against the harvesting attachment 5 during travel in the direction of travel F, As can be seen with reference to FIG. 2, the cutting and intake elements 11 are constructed in the form of drums and comprise individual driver discs 14 and at least one cutting disc 15 on the ground side. The cutting and carrying along of the stalk crop, in particular the maize plants, in the cutting and intake elements 11 is undertaken in a known manner, and so the special configuration of the cutting and intake elements 11 and their function will not be described further.

Wall elements 16, 17, 18 are arranged in each case on the rear side of the base unit 6, the intermediate wings 7 and the outer wings 8 and the crop can be guided on them inward in the direction of the intake rollers 3.

Figure 2:
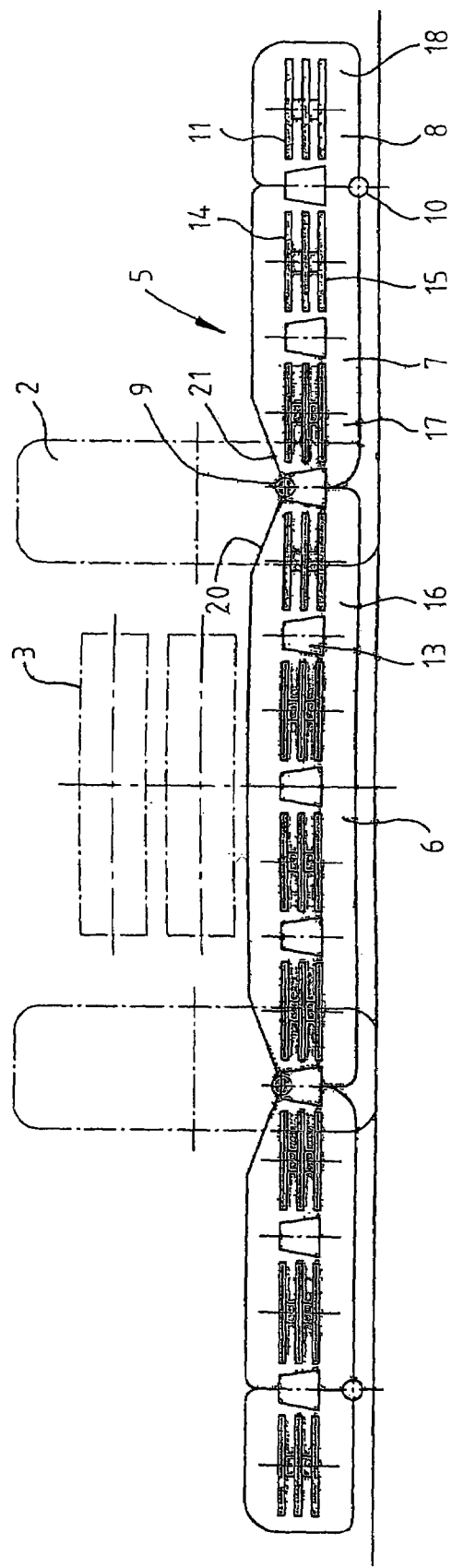
FIG. 2 is a front view of the machine shown in FIG. 1 with cutting and intake units in a working position.

In the position illustrated according to FIGS. 1 and 2, the harvesting attachment 5 is in the working position with maximum width.

Figure 3:
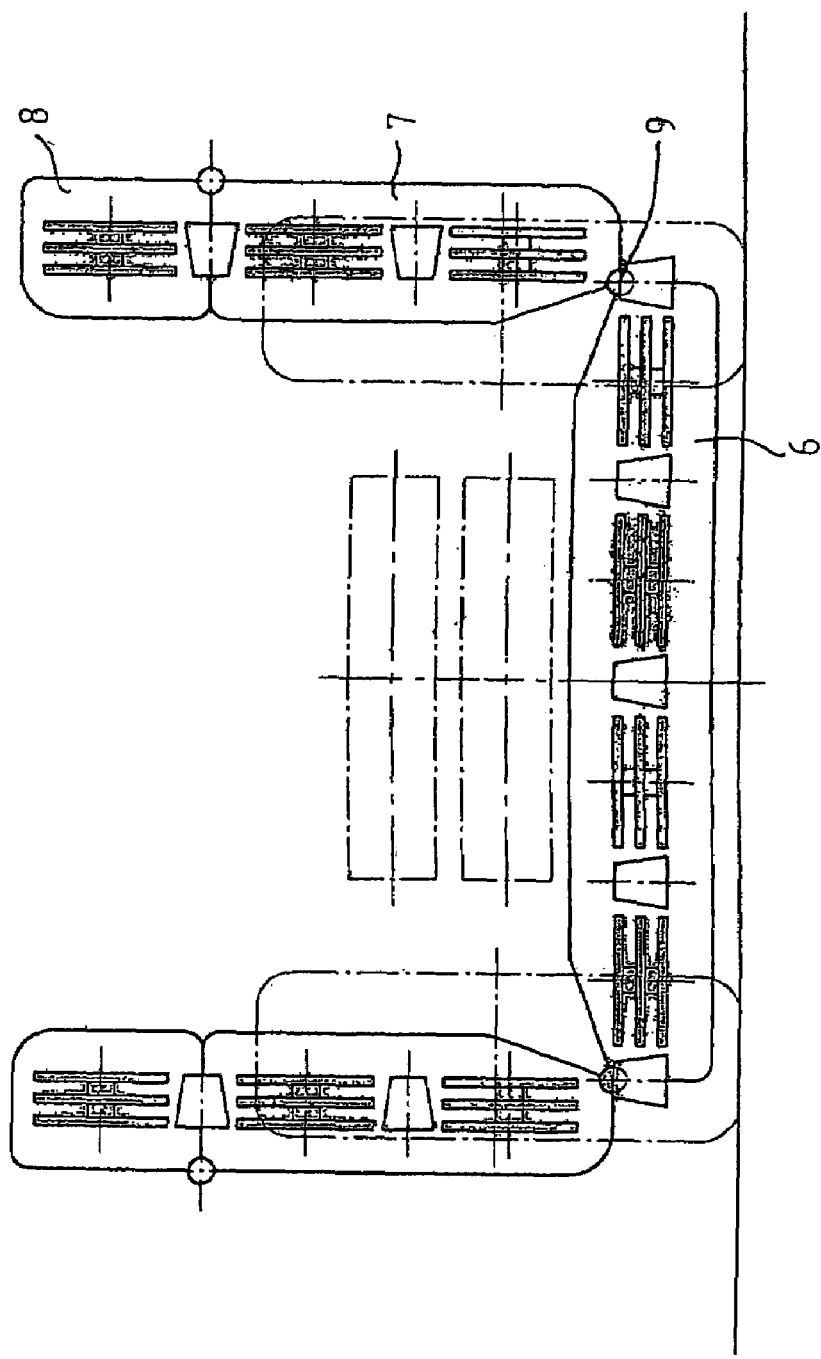
FIGS. 3 and 4 are front views similar to FIG. 2, but showing intermediate positions of the cutting and intake units during the transition into a transporting position.

To pivot the harvesting attachment 5 into a transporting position, first of all the intermediate wings 7 are pivoted into a vertical position as illustrated in FIG. 3. This pivoting movement is undertaken by conventional driving means, for example by hydraulic cylinders.

Figure 4:
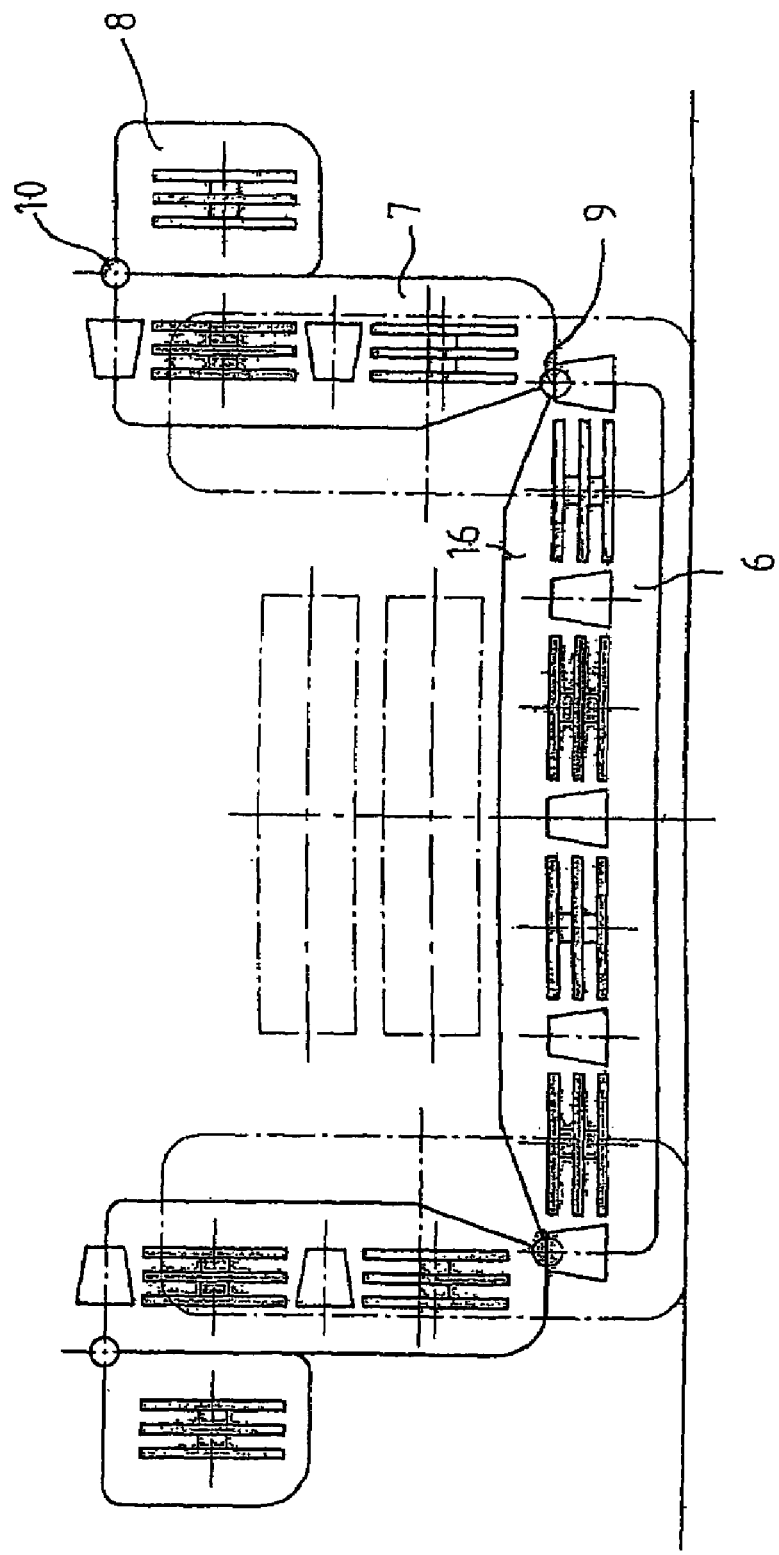

Starting from this vertical intermediate position of the intermediate wings 7, each outer wing 8 can now, as shown in FIG. 4, be folded downward through 180° about the pivot axis 10. This pivoting movement is also carried out with conventional driving means, for example a further hydraulic cylinder. It can also be readily seen that this 180° rotation about a single pivot axis 10 is made possible by the fact that the pivot axis 10 is adjacent the ground when in the working position shown in FIG. 2. The position shown in FIG. 4 can accordingly be reached without the individual components of the outer wing 8 colliding with the intermediate wing 7.

Figure 5:
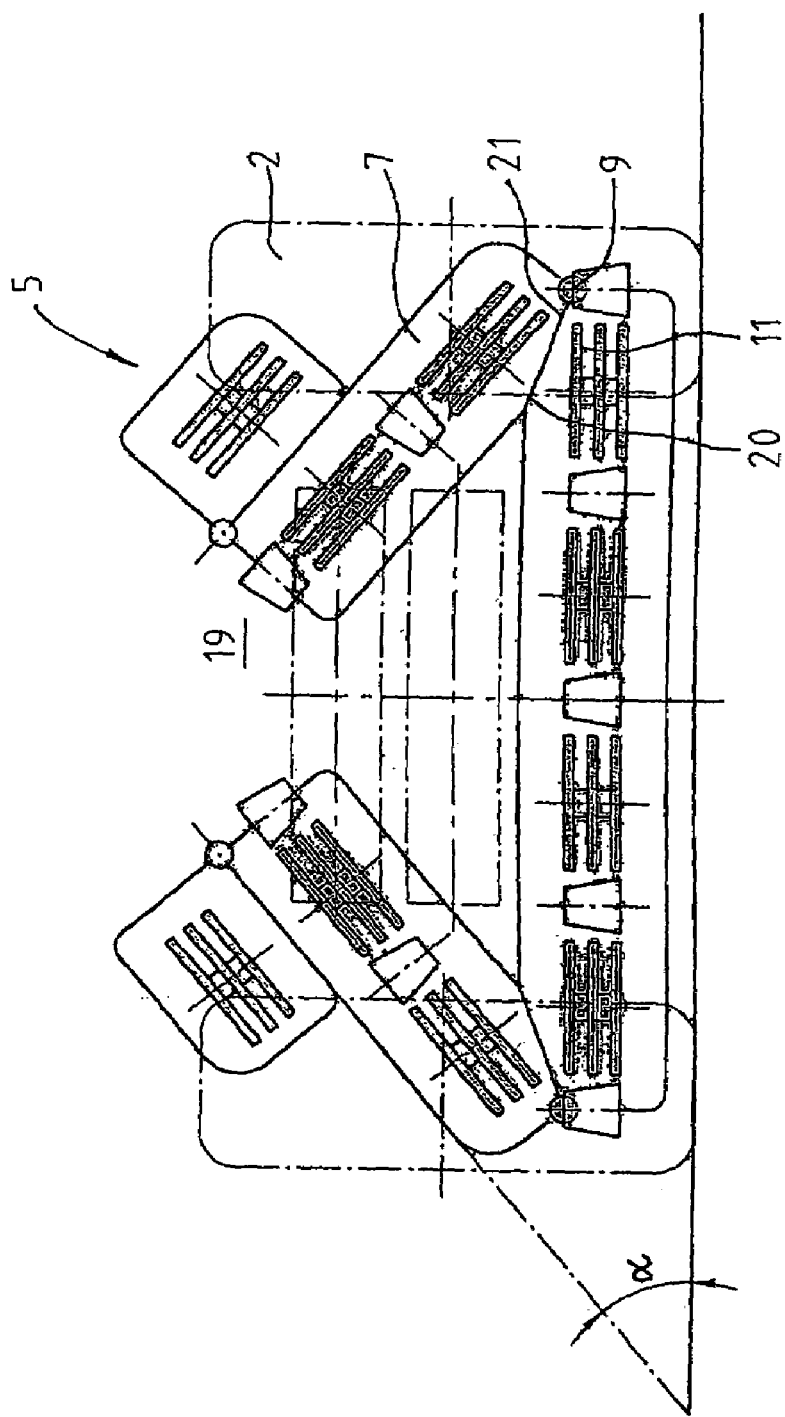
FIG. 5 is a front view of the machine with the cutting and intake units in the transporting position.

In a further step, each intermediate wing 7 is then inclined inward until the transporting position shown in FIG. 5 is reached. In this position, the harvesting attachment 5 does not protrude laterally over the road wheels 2 at any point. The intermediate wings 7 are inclined inward about the angle α, but a gap 19 remains. This gap permits a free view of the road from the driver's cab (not illustrated) which is located above the road wheels 2.

The locking of the transporting position can be obtained mechanically via corresponding regulating mechanisms or else by securing in place hydraulically. If hydraulic working cylinders are used for the pivoting movements during the transition between the working position and the transporting position and vice versa, the transporting position can be secured via a hydraulic locking of these working cylinders. A combination of mechanical locking and securing it in place hydraulically is also readily conceivable. In that case the mechanical locking may be implemented separately from the working cylinders or else in the form of an "end position locking" of the working cylinders.

As can be seen with reference to FIG. 4, the pivot axes 9 are situated in the upper a half of the edge element 16, which forms the rear wall of the base unit 6. The pivot axis 9 is situated level with (i.e. no lower than) the upper end of the cutting and intake elements 11. This enables the transporting position shown in FIG. 5 to be reached without the cutting and intake elements 11 colliding. Advantageously the wall elements 16 and 17 of the base unit 6 and of the intermediate wing 7, respectively, are slightly beveled in the region of the pivot axis 9. The bevels 20, 21 project over the cutting and intake elements 11 and therefore the pivot axis 9. The bevels 20, 21 are in this case selected in such a manner that they are joined to each other when the pivoting angle a in the transporting position is set. If, in addition, the bevels 20, 21 are arranged so that they meet at the pivot axis 9, then the recesses required in the rear wall formed by the wall elements 16, 17, 18 are as small as possible.

The joints containing the pivot axes 9, 10 are expediently designed as hinge joints which absorb the forces occurring to the rear during the harvesting process due to the forward travel of the harvesting machine and the crop striking against it, and the torques produced as a result.

To ensure the horizontal working position (see FIG. 2) even when the base part 6 is being raised, the hinge joints 10 may furthermore be designed in such a manner that the intermediate wings 7 are prevented from folding down outward from the base unit 6, for example via stops. On the other hand, however, the horizontal working position can also be set and fixed without mechanical stops via the driving elements, for example via hydraulic working cylinders. In both cases, the setting of the height of the working position is possible via adjustment in height of the base unit 6.

The invention in its broader aspects is not limited to the specific mechanisms shown and described but departures may be made therefrom within the scope of the accompanying claims without departing from the principles of the invention and without sacrificing its chief advantages.

What is claimed is:

1. A harvesting machine having a plurality of cutting elements supported by frames, a support assembly comprising:
    a center frame said center frame supporting a first cutting element;
    two intermediate frames being moveable around two first pivots between a working position and at least one transport position, said intermediate frames pivoting inwardly relative to said center frame when said intermediate frames are moved from said working position to said at least one transport position, said intermediate frames supporting two second cutting elements;
    two outer frames said outer frames being moveable around two second pivots between a working position and at least one transport position, said outer frames pivoting outwardly around said second pivots relative to said intermediate frames when said outer frames are moved from said working position to said at least one transport position, said outer frames supporting two third cutting elements.

2. A harvesting machine according to claim 1 further comprising two first apparatuses, said first apparatuses being operative to pivot each of said intermediate frames, respectively, inwardly to a transport position.

3. A harvesting machine according to claim 1, further comprising two second apparatuses, said second apparatuses being operative to pivot each of said outer frames, respectively, through 180° with respect to said intermediate frames.

4. A harvesting machine according to claim 1, wherein said intermediate frames and said outer frames are positioned to provide a forward field of view substantially at a centerline of the machine, said forward field of view being unimpaired by said intermediate frames and said outer frames when at least said intermediate frames are in a transport position.

5. A harvesting machine according to claim 4, wherein said forward field of view is unimpaired when said intermediate frames are in said at least one transport position and said outer frames are in said at least one transport position.

* * * * *